United States Patent [19]

Kawasaki

[11] Patent Number: 5,561,818
[45] Date of Patent: Oct. 1, 1996

[54] MICROPROCESSOR AND DATA PROCESSING SYSTEM FOR DATA TRANSFER USING A REGISTER FILE

[75] Inventor: Soichi Kawasaki, Tokyo, Japan

[73] Assignee: Kabushiki Kaisha Toshiba, Kawasaki, Japan

[21] Appl. No.: 31,200

[22] Filed: Mar. 12, 1993

[30] Foreign Application Priority Data

Mar. 12, 1992 [JP] Japan .................... 4-053735

[51] Int. Cl.$^6$ .................... G06F 13/00; G06F 13/14
[52] U.S. Cl. .................... 395/843; 395/842; 395/200.07; 395/427; 364/243.5; 364/256.8; 364/260
[58] Field of Search .................... 395/275, 425, 395/842, 843, 200.07, 427

[56] References Cited

U.S. PATENT DOCUMENTS

| | | | |
|---|---|---|---|
| 3,771,137 | 11/1973 | Barner et al. | 340/172.5 |
| 4,352,157 | 9/1982 | Namimoto et al. | 364/200 |
| 4,410,944 | 10/1983 | Kronies | 364/200 |
| 4,415,971 | 11/1983 | Guillemet et al. | 364/200 |
| 4,466,098 | 8/1984 | Southard | 371/9 |
| 4,858,111 | 8/1989 | Steps | 364/200 |
| 4,905,200 | 2/1990 | Pidsosny et al. | 364/300 |
| 4,928,225 | 5/1990 | McCarthy et al. | 364/200 |
| 5,119,485 | 6/1992 | Ledbetter, Jr. et al. | 395/425 |
| 5,131,081 | 7/1992 | MacKenna et al. | 395/275 |
| 5,263,144 | 11/1993 | Zurawski et al. | 395/425 |

OTHER PUBLICATIONS

Hay, I. et al., "TRON-Compatible 16/32-bit Microprocessor" *Microprocessors and Microsystems*, vol. 13, No. 9, Nov. 1989.

*Primary Examiner*—Thomas C. Lee
*Assistant Examiner*—Rehana Perveen Krick
*Attorney, Agent, or Firm*—Foley & Lardner

[57] ABSTRACT

A microprocessor having a register file inside is so combined with an external memory through a dedicated high-speed bus that the memory operates as a bank for said register file. This microprocessor further has means for controlling a data transfer with said memory or peripheral devices. When an address information to access said memory is input to this microprocessor in order to control a data transfer between said memory and a peripheral device, said control means finds if the accessed area in said memory is now in use as a bank for said register file, or not. When it is in use, said control means controls a data transfer between said peripheral device and said register file, instead of controlling the data transfer between said memory and said peripheral device. So, said peripheral device can always access the newest information in said memory.

19 Claims, 2 Drawing Sheets

MICROPROCESSOR AND DATA PROCESSING SYSTEM FOR DATA TRANSFER USING A REGISTER FILE

BACKGROUND OF THE INVENTION

1. Field of the Invention

This invention relates to a microprocessor, which has a bank structure, and a data processing system in which said microprocessor is incorporated. In particular, this invention relates to a microprocessor which has a structure to conduct data processing by connecting a particular memory (bank RAM), which is mapped on an address map of a data processing system, with a group of registers contained in this microprocessor, and the data processing system itself.

2. Description of Prior Art

Generally speaking, in a data processing system, such as a microprocessor system, memory devices having high-speed access ability and multi-ports are incorporated as general purpose registers in the microprocessor (referred to as MPU, below). The number of such devices which can be contained in the MPU is limited by the size of a semiconductor chip.

Consequently, a microprocessor system having a bank structure has been proposed. In this system, the word 'bank' means a group of registers which are mainly used for operations in the MPU. In usual, the number of banks for one task is determined according to the MPU program. In actuality, several banks are incorporated in the MPU. When a task is switched into another, a group of registers, that is, a bank, is switched into another. As mentioned above, the number of banks incorporated in the MPU is limited according to the chip size of this MPU. Therefore, many banks cannot be incorporated in the MPU.

In order to increase the number of banks which can be utilized by the MPU, a system having an external memory is proposed. In this system, banks are saved in areas of a special memory (bank RAM) mapped on the address map of this MPU. When a particular bank saved in a certain area of the bank RAM is recalled by the MPU, the data in said area is taken out from the memory and loaded on the bank in the MPU. In this case, if the data transfer between a bank inside the MPU and the bank RAM outside the MPU is carried out through external buses, the MPU must stop for a long time until the bank exchange is completed. Therefore, the data transfer between the bank in the MPU and the bank RAM is conducted through a dedicated bus at a high speed.

As mentioned above, in the microprocessor system having the bank structure, bank exchange between the bank RAM outside the MPU and the bank in the MPU is conducted through the dedicated high speed bus, instead of external buses. In this system, however, the following problem arises. When a peripheral device of the MPU accesses the bank RAM through external buses, the device does not recognize whether the content in the accessed area of the bank RAM is now in use by the MPU as a bank or not. Only the MPU recognizes whether the content accessed by said peripheral device is now in use by itself, or not. Accordingly, when the MPU uses the bank RAM as a bank, the peripheral device is able to access only the old information of the bank RAM. In other words, when the MPU uses the bank RAM as a bank, the peripheral device cannot access the newest information in the bank RAM.

SUMMARY OF THE INVENTION

This invention has been made to overcome the above mentioned disadvantage of the prior art microprocessor and data processing system.

Therefore, the first objective of the present invention is to provide a microprocessor which can be incorporated in a data processing system having a bank structure and has a function to effectively control the data transfer between itself and an external memory, in order that a peripheral device is able to access the newest information in said external memory.

Another objective of the present invention is to provide a data processing system having said microprocessor and a memory, the system in which the data transfer inside this system can be controlled effectively so that a peripheral device in this system can access the newest information in said memory.

The first feature of the present invention provides a microprocessor which is comprised of the following as shown in FIG. 1: a register file 7; and means 12 for controlling the data transfer between said register file 7 and an external memory 2 which is connected to the present microprocessor 1 itself through a dedicated bus 17; wherein said means 12 has a function to control a data transfer between said register file 7 and a peripheral device 30, which is connected to said external memory 2 through an external data bus DBUS, or the microprocessor 1 itself, instead of a data transfer between said external memory 2 and peripheral device 30 or the microprocessor, when a particular address area in said external memory 2, the area which corresponds to the bank now in use in register file 7, is accessed by said peripheral device 30 or the microprocessor 1 itself through said external data bus DBUS.

The second feature of the present invention is in the fact that said control means 12 has a pointer 10 to hold a first address of a memory area in which the bank now in use in register file 7 is stored.

The third feature of the present invention is in the fact that said control means 12 has an adder-subtracter 25 (or an adder, shown in FIG. 2) in addition to said pointer 10, so as to compare the address information input, from peripheral device 30 or microprocessor 1, with the content in said pointer 10.

The fourth feature of the present invention provides a data processing system, which is comprised of the following as shown in FIG. 1: a microprocessor 1 which has the structure having said first, second, or third feature; memory 2 which is mapped on the address map of this data processing system; at least one peripheral device 30; data bus DBUS which connects among microprocessor 1, peripheral device 30, and memory 2; address bus ABUS which connects between microprocessor 1 and peripheral device 30; and dedicated bus 17 which connects microprocessor 1 with memory 2.

According to the first feature of the present invention, control means 12 has a function to find if peripheral device 30 or microprocessor 1 itself has accessed said address area, which corresponds to the bank now in use, in said memory 2 or not. When control means 12 finds that the accessed area in memory 2 corresponds to the address area in which the bank now in use is stored, it controls a data transfer between register file 7 and peripheral device 30 or microprocessor 1, instead of controlling a data transfer between memory 2 and peripheral device 30 or microprocessor 1. This is because the newest information concerning the accessed area in memory 2 is now in said register file. On the other hand, when control means 12 finds that the accessed area in memory 2 does not correspond to said address area in which the bank now in use in register file 7 is stored, it controls a data transfer between memory 2 and peripheral device 30 or microprocessor 1 itself. As a result, peripheral device 30 or the microprocessor 1 can always obtain the newest information concerning about the accessed area in memory 2, even in the case where the area is used as the bank now in use in register file 7.

According to the second feature of the present invention, pointer 10 holds the first address of a memory area in which the bank now in use in the register file is stored. Therefore, by comparing the address information accessed by peripheral device 30 or microprocessor 1 with the content in said pointer 10, control means 12 can easily find if said address information corresponds to said address area, in which the bank now in use in register file is stored, or not. When it corresponds to said address area, means 12 controls a data transfer between register file 7 and peripheral device 30 or microprocessor 1, instead of controlling a data transfer between memory 2 and peripheral device 30 or microprocessor 1.

According to the third feature of the present invention, a subtraction is carried out between the content in said pointer 10 and a part of said address information. As a result, control means 12 can easily find if said address information corresponds to said address area in which the bank now in use in register file 7 is stored.

According to the fourth feature of the present invention, memory 2 is combined with register file 7 contained in microprocessor 1, so as to operate the register file 7 as a bank. In this case, the data transfer between register file 7 and memory 2 is controlled through dedicated bus 17, so that the data transfer can be controlled at a high speed. In addition, in the case where peripheral device 30 or microprocessor 1 itself accesses memory 2, microprocessor 1 has a function to find if they have accessed a particular area in said memory 2, the area which is now in use as a bank in said register 7. Therefore, if the address information accessed by peripheral device 30 or microprocessor 1 corresponds to said area now in use as a bank, microprocessor 1 controls the data transfer between said register file 7 and peripheral device 30 or microprocessor 1, instead of controlling the data transfer between memory 2 and peripheral device 30 or microprocessor 1. So, peripheral device 30 or microprocessor 1 can always access the newest information in memory 2, even in the case where the accessed area is now in use as a bank in register file 7.

These and other objectives, features, and advantages of the present invention will be more apparent from the following detailed description of preferred embodiments in conjunction with the accompanying drawings.

DETAILED DESCRIPTION OF THE EMBODIMENTS

Figure 1:
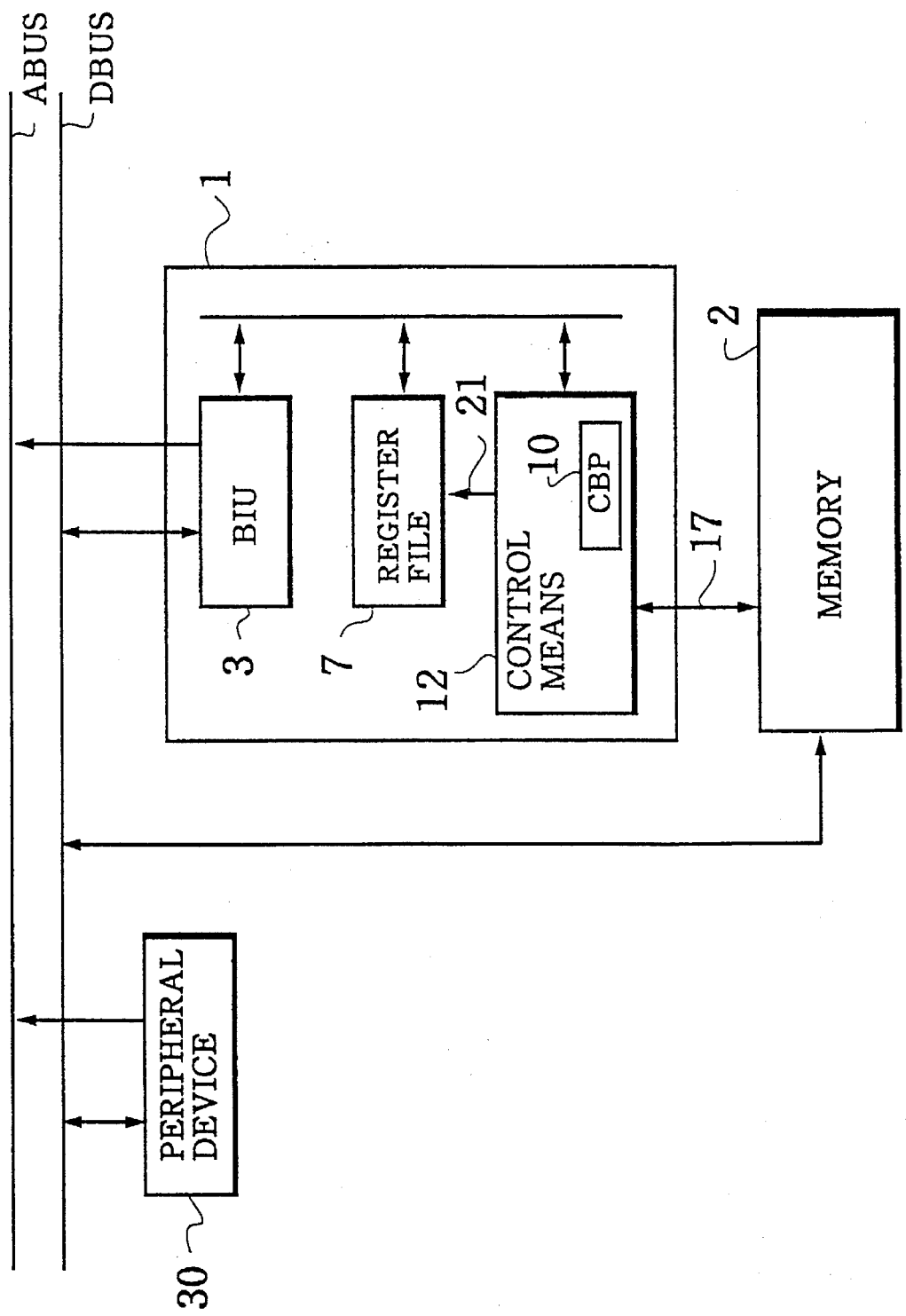
FIG. 1 is a block diagram illustrating the present invention.
Figure 2:
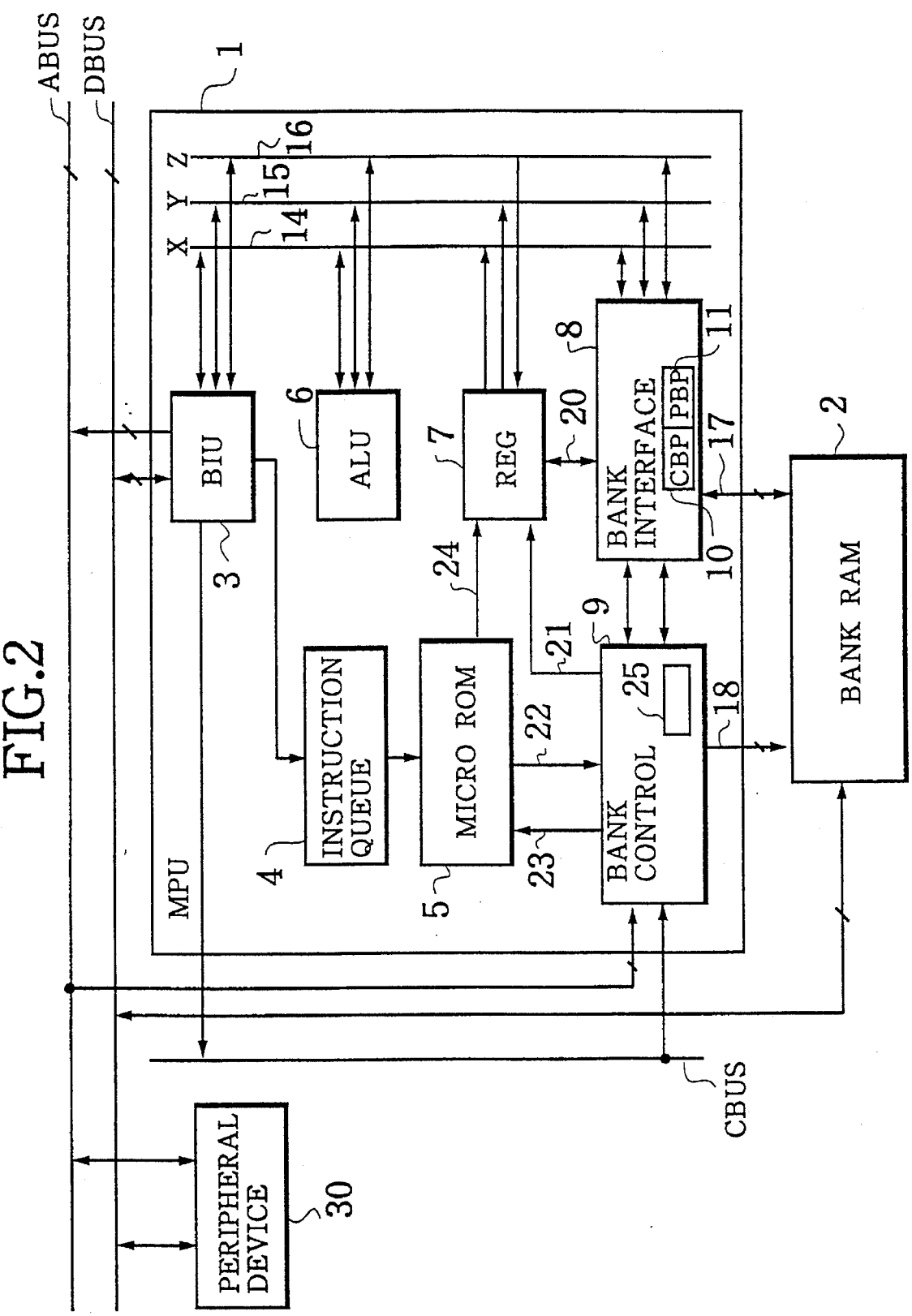
FIG. 2 is a block diagram illustrating the structure of a microprocessor and a data processing system according to one embodiment of the present invention.

FIG. 2 shows the structure of a microprocessor according to one embodiment of the present invention, and a data processing system in which said microprocessor is incorporated.

As shown in the figure, the data processing system is comprised of a microprocessor (referred to as MPU, below) 1, bank RAM 2, an external address bus ABUS, an external data bus DBUS, an external control bus CBUS, and at least one peripheral device 30. MPU 1 is connected with said buses as shown in FIG. 2. On the other hand, bank RAM 2 is connected with data bus DBUS. This bank RAM 2 is also connected with MPU 1 through dedicated high-speed bus 17 and bank RAM address control signal 18. In this system, at least one peripheral device 30, such as an I/O, a ROM, and a RAM, each of which is mapped on the address map of MPU 1 through external address bus ABUS, data bus DBUS, and control bus CBUS, is connected to MPU 1.

MPU 1 is comprised of the following: a bus interface unit (BIU) 3; an instruction queue 4; a micro-ROM 5; an arithmetic and logical unit (ALU) 6; a register file (REG) 7; a bank interface unit 8; and a bank control unit 9. In reality, the signal connection among bus interface unit 3, instruction queue 4, micro-ROM 5, arithmetic and logical unit 6, and register file 7 is very complicated. However, this connection is not related to the main purpose of this invention, so that it is shown briefly.

Bank RAM 2 is connected with bus interface unit 8 in MPU 1 through dedicated high-speed bus 17. However, bank RAM 2 is controlled by MPU 1 or peripheral device 30 through bank RAM address control signal 18 which is output from bank control unit 9 in MPU 1. Bank RAM 2 is also connected with external data bus DBUS in order to exchange data with MPU 1 or peripheral device 30, in the similar manner as that of a ROM and a RAM (not shown) which are mapped on the address map of the data processing system.

Bank interface unit 8 contains a current bank pointer (CBP) 10 and a previous bank pointer (PBP) 11. Current bank pointer 10 holds the data (or the address itself) indicating a particular address area of bank RAM 2, the area which is now in use as a bank in register file 7. On the other hand, previous bank pointer (PBP) 11 holds the data (or the address itself) indicating another particular address area of bank RAM 2, the area which is the return area of another bank to be recalled by register file 7 at the completion of the task under operation.

Bank control unit 9 contains an adder-subtracter 25 which controls arithmetic operations between the data from current bank pointer 10 and external address bus ABUS. These operations in adder-subtracter 25 are carried out in order to find if peripheral device 30 accesses the address area of the bank, now in use by MPU 1, in bank RAM 2, as well as to transfer data between register file 7 and bank RAM 2 at a high speed using dedicated bus 17, which has the maximum data width between register file 7 and bank RAM 2. Such a high-speed data transfer takes place when bank exchange between register file 7 and bank RAM 2 is required. Because a subtraction can be carried out by an addition, an adder is used instead of said adder-subtracter 25.

Usually, under the control by register file address control signal 24 output from micro ROM 5, register file 7 transfers data with MPU 1 itself, or peripheral device 30 through bus interface unit 3, which is connected with register file 7 via internal X bus 14, Y bus 15, and Z bus 16. On the other hand, in order to carry out bank exchange at a high speed according to a requirement from micro ROM 5, the data transfer between bank RAM 2 and register file 7 is controlled through bank interface unit 8. Also, according to a requirement from peripheral device 30, the data transfer between external data bus DBUS and register file 7 is controlled through bank interface unit 8.

In an ordinary occasion, the data transfer between bank RAM 2 and external data bus DBUS is executed under the control by bank RAM address control signal 18 from bank control unit 9. This control by signal 18 is based on instructions obtained from peripheral device 30 through external address bus ABUS and control bus CBUS. Bank RAM 2 also has a function to connect external DBUS with dedicated high speed bus 17, when said instructions obtained through external address bus ABUS and control bus CBUS are concerned about the return area of a bank in bank RAM 2, the bank which is now in use in register file 7. Bank RAM 2 has another function to exchange data with register file 7 through dedicated high speed bus 17, when MPU 1 itself requires high-speed bank exchange.

Next, the operation of the data processing system shown in FIG. 2 will be explained in the following cases: (1) the high speed data transfer between bank RAM 2 and register file 7; (2) the data transfer between bank RAM 2 and peripheral device 30; and (3) the data transfer between register file 7 and peripheral device 30.

(1) In the case of a high speed data transfer between bank RAM 2 and register file 7:

The high speed data transfer between bank RAM 2 and register file 7 takes place at the exchange of banks. Such exchange of banks occurs in the following situations: when an interruption occurs according to the control by a program or signals applied from outside MPU 1; when a program requires to do so; and when an original program is recalled after the completion of an interruption. In said situations, unlike a RAM and a ROM outside MPU 1, bank RAM 2 should operate in the same way that register file 7 in MPU 1 is accessed. Therefore, like register file 7, bank RAM 2 should transfer data at a very high speed which is almost the same as the operating speed of MPU 1. To that end, dedicated high speed bus 17, which has a larger bus width than that of external data bus DBUS, is used in order to transfer data at a high speed between bank RAM 2 and register file 7.

Exchange of banks is controlled in order to store a bank, now in use by MPU 1, into bank RAM 2 due to the generation of interruption. Such exchange is also controlled in order to transfer a bank, to be used in an interrupt routine, from bank RAM 2 to register file 7. In actuality, when an interruption occurs, bank control unit 9 generates address information 21 for register file 7 and bank RAM address control signal 18 for bank RAM 2 in every data transfer unit one after another, so as to store banks into bank RAM 2. In this case, address information 21 and bank RAM address control signal 18 are produced in adder-subtracter 25 contained in bank control unit 9, by executing arithmetic operations on the content in current bank pointer 10. As mentioned before, current bank pointer 10 holds the data (or the address itself) indicating the address area of a bank in bank RAM 2, the bank which is now in use by MPU 1.

In said case, if the interruption takes place under the control by external signals, the contents in a program status word PSW, a stack pointer PC, and previous bank pointer 11 should also be stored into bank RAM 2. As mentioned before, previous bank pointer 11 holds the data (or the address itself) indicating the return area of another bank in bank RAM 2, the bank which is to be recalled by register file 7 at the completion of the task under operation. On the other hand, in the case of interruption by program, the contents in program counter (PC), program status word (PSW), and previous pointer 11 should be stored into a stack memory.

Next, the content in current bank pointer 10 is copied into previous bank pointer 11. Thereafter, according to the generation of an interruption, new bank information based on the interrupt vectors is processed to produce a new address data of bank RAM 2, the data which correspond to a new bank to be newly used in the interrupt routine. In this address of bank RAM 2, a new bank, which will be available in MPU to execute the interrupt routine, is stored. The new address information thus obtained is then transferred into current bank pointer 10.

The new content in current bank pointer 10 obtained as mentioned above is processed in adder-subtracter 25 in bank control unit 9. Thus, bank control unit 9 again produces address information 21 for register file 7 and bank RAM address control signal 18 for bank RAM 2 in every data transfer unit one after another, so as to transfer a required bank from bank RAM 2 to register file 7. In this case, if the interruption occurs according to the control by a program, the content in previous pointer 11 is changed to be specially fixed data. According to these data, it is recognized that program pointer PC, program status word PSW, and previous bank pointer 11, which are required to return from the interruption, are stored not in bank RAM 2 but in the stack memory.

The bank exchange by program is controlled when a programmer manages banks with intention using a subroutine. In this case, only the content in current bank pointer 10 should be changed. Therefore, in the same manner as that of the interruption process mentioned above, bank control unit 9 controls arithmetic operations to the content in current bank pointer 10 using adder-subtracter 25, according to control signals from micro ROM 5. Thus, address information 21 for register file 7 and bank RAM address control signal 18 for bank RAM 2 are produced in unit 9 every data transfer unit one after another, so as to transfer a required bank from bank RAM 2 to register file 7.

The bank exchange for the return from the interruption is controlled according to a return instruction. Control signal 22 from micro ROM 5 is generated according to said return instruction. In this case, bank control unit 9 transfers the data in previous bank pointer 11 into current bank pointer 10. Thereafter, unit 9 controls arithmetic operations on the new content in current bank pointer 10 using adder-subtracter 25, and then produces new address information 21 for register file 7 and bank RAM address control signal 18 for bank RAM 2 in every data transfer unit one after another. Thus, the bank to be recalled is transferred from bank RAM 2 to register file 7. In this case, if the interruption was made by external signals, program counter PC, program status word PSW, and previous bank pointer 11, each of which have been stored in bank RAM 2 at the generation of the interruption, are transferred into register file 7. On the other hand, in order to store the bank, which has been used in register file 7, the content in the bank should be transferred from register file 7 to bank RAM 2 using the bank exchange process by program. In the case of interruption by program, program counter PC, program status word PSW, and previous bank pointer 11 are recalled from the stack memory.

(2) In the case of a data transfer between bank RAM 2 and peripheral device 30:

The data transfer between bank RAM 2 and peripheral unit 30 is an indispensable function for bank RAM 2 to operate in the same manner as a RAM or a ROM which are mapped on the address map of this data processing system. In this transfer, bank RAM 2 is connected with external address bus ABUS, data bus DBUS, and control bus CBUS. In said case, however, bank RAM 2 is the body storing the data concerning banks. Accordingly, if peripheral device 30 accesses a particular area in bank RAM 2, the area which corresponds to the bank now in use by MPU 1, it is not always true that the current content in this area is the newest information. This is because the content in the bank now in use by MPU 1 will always be restored into said area of bank RAM 2, as explained in (1). Accordingly, when said particular area, which corresponds to the bank now in use in register file, is accessed by peripheral device 30 in this embodiment, the bank exchange process (3) described below is executed between register file 7 and peripheral device 30, instead of this process (2).

(3) In the case of a data transfer between register file 7 and bank RAM 2:

In a usual data processing system, data transfer between a MPU and a peripheral device, such as a RAM or a ROM, which is mapped on the address map of the MPU, or between peripheral devices are controlled using external address bus ABUS, data bus DBUS, and control bus CBUS. In actuality, address and control signals output from bus interface unit 3 in MPU 1 are supplied to external address bus ABUS and control bus CBUS respectively. Then the peripheral device responds to these signals, and then the data transfer between peripheral devices is carried out through external data bus DBUS.

When a data transfer control apparatus, such as a DMA controller, is connected to external address bus ABUS, data bus DBUS, and control bus CBUS, the data transfer between peripheral devices should be controlled by this DMA controller. Accordingly, contrary to the bank exchange request from inside MPU 1, the data transfer request from MPU 1 or the DMA controller through the external buses will be considered as the request from the periphery of MPU 1.

The process (2) or (3) is executed when a peripheral device accesses bank RAM 2. In other words, either one of said operations is executed when an address to specify bank RAM 2 is supplied on external address bus and when signals contained in external control bus CBUS, such as a bus start signal, a chip select signal, and a data read-write signal, become active.

The operations (2) and (3) will be explained next using one example. In this example, both current bank pointer 10 and previous bank pointer 11 have 8 bits, register file 7 has 32 bytes, external address bus ABUS has 24 bits (address 000000H to FFFFFFH, H means the hexadecimal representation), the address map of bank RAM 2 has 0 to 2K bytes (address 000000H to 0007FFH), external data bus DBUS has 16 bits, and dedicated high-speed bus 17 has 64 bits. In addition, external control bus CBUS has a bus start signal to indicate the beginning of a bus cycle, a read-write signal to indicate that data are input to or output from external data bus DBUS, and a chip select signal to activate a ROM or a RAM, which are provided around MPU 1.

The 8 bit data, which are obtained by shifting the 3 bits of current bank pointer 10 to the left, are set at the higher 8 bits, and the 3 bit data '000' are set at the lower 3 bits, thus providing 11 bit data. These data indicate the lower 11 bits of the first address of an address area in bank RAM 2, the area which corresponds to the bank now in use by MPU 1. The data transfer between register file 7 and bank RAM 2 for the exchange of banks is carried out as follows. The 8 bit data, which are obtained by shifting the 3 bits of current bank pointer 10 to the left, are incremented to produce 8 byte address signals. These address signals are supplied into bank RAM 2 through bank RAM address control signal 18. Then, the data are transferred four times by 64 bit width through dedicated high-speed bus 17 between bank RAM 2 and register file 7. In this case, the address for register file 7 is incremented four times by 8 bytes. In other words, the continuous data of bank RAM 2 beginning from said 11 bit address are loaded on the bank. Said 11 bit address data are produced as follows. The 8 bit data, which are obtained by shifting the 3 bits of current bank pointer 10 to the left, are set at the higher 8 bits, and the 3 bit data '000' are set at the lower 3 bits, thus providing said 11 bit address data.

Bank control unit 9 in MPU 1 monitors the lower 11 bits of external address bus ABUS and external control bus CBUS. When bank RAM 2 is accessed via the chip select signal on external control bus CBUS, adder-subtracter 25 in bank control unit 9 conducts a subtraction between the higher 8 bits of the lower 11 bits of external address bus ABUS and the 8 bits of current bank pointer 10. If the result of said subtraction is between 0 to 3, it means that the content in bank RAM 2 accessed by the peripheral device is now in use in register file 7 as a bank. If the result is not between 0 to 3, the content in bank RAM 2 accessed by the peripheral device is not in use in register file 7.

When the content in bank RAM 2 accessed by the peripheral device is not in use by MPU 1 as a bank, bank control unit 9 outputs the lower 11 bits of external address bus ABUS to bank RAM 2 without a change. Also, bank control unit 9 processes the bus start signal, read-write signal, and chip select signal contained in external control bus CBUS, and then, outputs the resulting signal as bank RAM address control signal 18. Thus, the content in bank RAM 2 is transferred into peripheral unit 30 through external data bus DBUS.

On the contrary, when the content in bank RAM 2 accessed by the peripheral device is in accord with the content in register file 7 which is now in use by MPU 1, bank control unit 9 outputs register file address control signal 21 to register file 7. This signal 21 is produced from external control bus CBUS and a 5 bit address signal, in which the higher 2 bits of the operation result in adder-subtracter 25 are placed in its higher part, and the lower 3 bits of external address bus ABUS are placed in its lower part. On the other hand, bank interface unit 8 connects the data bus from register file 7 with dedicated high-speed bus 17.

In said occasion, bank control unit 9 also controls bank RAM 2 using bank RAM address control signal 18, so that dedicated high speed bus 17 is connected with external data bus DBUS. However, the bus width of dedicated high-speed bus 17 deletes from that of external data bus DBUS. Accordingly, in order to connect high-speed bus 17 with data bus DBUS, the essential 16 bits data are taken out from dedicated high-speed bus 17 using the higher 2 bits among the lower 3 bits of external address bus ABUS. Then, said 16 bit data are made to run on external data bus DBUS. In this case, the content in bank RAM 2 is not accessed at all.

As explained above, when the content in bank RAM 2 accessed by a peripheral device is in accord with the content in register file 7, which is now in use as a bank by MPU 1, the data transfer is controlled between the peripheral device and register file 7 instead of bank RAM 2. In this case, the data in register file 7 run on external data bus DBUS in the same timing as that of the access for bank RAM 2.

In addition, when the content in bank RAM 2 accessed by the peripheral device is in accord with the content in register file 7, which is now in use as a bank by MPU 1, register file 7 is accessed instead of bank RAM 2. In this case, bank wait signal 23 notifies MPU 1 that register file 7 is now being accessed. Thus, the operation of MPU 1 is not influenced by said operation of the peripheral device.

As explained above, the data processing system of this embodiment stores, into current bank pointer 10, of information concerning about the first address of an address area in bank RAM 2, the area which corresponds to the bank now in use in register file 7. The content in current bank pointer 10 is, then, compared with the address information which is input from peripheral device 30, so as to find if peripheral device 30 accesses a particular area in bank RAM 2, the area which corresponds to the bank now in use in register file 7, or not. As a result of said comparison, if the area in bank RAM 2 accessed by peripheral device 30 is found to correspond to the address area of the bank now in use in register file 7, data access is executed for register file 7 instead of bank RAM 2. Thus, peripheral device can always access the newest information in bank RAM 2.

In summary, the control means contained in the microprocessor of this invention has a function to find if a peripheral device or the microprocessor itself accesses a particular area in an external memory, the area which corresponds to the bank now in use by this microprocessor itself, or not. In the case where said area in the external memory is accessed, the control means controls a data transfer between a register file (bank) and said peripheral device or the microprocessor itself, instead of a data transfer between said external memory (bank RAM) and said peripheral device or the microprocessor itself. As a result, the microprocessor itself or said peripheral device can access the newest information in said external memory, even in the case where said area, corresponding to the bank now in use by this microprocessor, is accessed by them. In addition, said data transfer between the register file and the peripheral device or the microprocessor can be carried out through a dedicated high speed bus. So, this invention can provide a microprocessor and a data processing system, in which the newest information in an external memory can be correctly and efficiently accessed by a peripheral device or the microprocessor itself.

What is claimed is:

1. A microprocessor, comprising:
   a register file including a bank currently in use; and
   control means for controlling a data transfer between said register file and an external memory which is connected to the microprocessor through a dedicated bus;
   said control means controlling the data transfer between said register file and a peripheral device, the peripheral device being connected to said external memory through an external data bus or the microprocessor itself, instead of controlling a data transfer between said external memory and said peripheral device or the microprocessor, when a particular address area in said external memory is accessed by said peripheral device or the microprocessor itself for the data transfer through said external data bus, said particular address area corresponding to said bank currently in use in said register file,
   wherein said external data bus and said dedicated bus are connected and the data transfer between said register file and said peripheral device or the microprocessor itself is through said external data bus connected to said dedicated bus.

2. The microprocessor as claimed in claim 1, wherein said control means controls said data transfer between said register file and said peripheral device or the microprocessor itself through said dedicated bus.

3. The microprocessor as claimed in claim 1, wherein said control means includes a pointer holding a first address of said particular address area which corresponds to the bank currently in use in said register file, and wherein said control means compares the contents in said pointer with address information input from said peripheral device or the microprocessor and determines if said particular address area in said external memory is accessed by said peripheral device or the microprocessor.

4. The microprocessor as claimed in claim 3, wherein said pointer increases or decreases in value every data transfer unit which is selected at a maximum data width between said external memory and said register file.

5. The microprocessor as claimed in claim 3, wherein said control means includes an adder-subtractor or adder in which a subtraction is controlled between a part of said address information input and the content in said pointer, for comparing said address information input with the contents in said pointer.

6. The microprocessor as claimed in claim 5, wherein, when said control means determines if the result of said subtraction is in a predetermined range, said control means controls a data transfer between said register file and said peripheral device or the microprocessor.

7. The microprocessor as claimed in claim 1, wherein a bus width of said dedicated bus is wider than a bus width of said external data bus.

8. A data processing system, comprising:
   the microprocessor of claim 1;
   an external memory which is mapped on an address map of the data processing system;
   at least one peripheral device;
   an external data bus which connects said microprocessor, said peripheral device, and said external memory;
   an address bus which connects between said microprocessor and said peripheral device; and
   a dedicated bus which connects said microprocessor with said external memory.

9. The microprocessor as claimed in claim 8, wherein said external data bus and said dedicated bus are connected and a data transfer between said register file and said peripheral device or the microprocessor itself is through said external data bus connected to said dedicated bus.

10. The microprocessor as claimed in claim 9, wherein a bus width of said dedicated bus is wider than a bus width of said external data bus.

11. The data processing system as claimed in claim 8, wherein said external memory is a bank RAM.

12. The data processing system as claimed in claim 8, wherein said microprocessor controls data transfer between said register file and said peripheral device through said dedicated bus and said bank RAM.

13. The microprocessor as claimed in claim 4, wherein said control means includes an adder-subtractor or adder in which a subtraction is controlled between a part of said address information input and the contents in said pointer, for comparing said address information input with the content in said pointer.

14. A microprocessor, comprising:
   a register file including a bank now in use;
   a bank interface unit which is connected to an external bank RAM through a dedicated high speed bus and has a current bank pointer to hold the first address of an address area in said bank RAM, said address area corresponding to the bank now in use in said register file; and
   a bank control unit which has an adder-subtractor or adder to compare the content in said current bank pointer with an address information which is input through an external address bus;

said bank control unit determining from a result of said comparison whether said address information corresponds to said address area in said bank RAM or not, and when said address information corresponds to said area, said bank control unit instructing said register file and said bank interface unit to supply an external data bus connected to said bank RAM and a peripheral device for data communication therebetween with the data in said register file through said dedicated high-speed bus and said bank RAM, wherein said external data bus and said dedicated high speed bus are connected and a data transfer between said register file and said peripheral device or the microprocessor itself is through said external data bus connected to said dedicated bus.

15. The microprocessor as claimed in claim 14, further comprising:

a bus interface unit to connect with external buses;

a micro ROM which stores instructions for said register file;

an instruction queue which queues instructions for said micro ROM;

an arithmetic and logical unit; and internal buses which connect said bus interface unit, said arithmetic and logical unit, and said register file, and said control means.

16. The microprocessor as claimed in claim 14, wherein said control means includes a bank interface unit with a previous bank pointer which holds the first address of a previous address area in said bank RAM, said previous address area corresponding to another bank used before in said register file.

17. The microprocessor as claimed in claim 14, wherein a bus width of said dedicated bus is wider than a bus width of said external data bus.

18. A microprocessor system, comprising:

a microprocessor;

a register file included in said microprocessor and including a bank of registers currently in use by said microprocessor;

a memory external to said microprocessor, said external memory including address locations storing data which may be transferred to and from said bank of registers;

an address bus;

control means for controlling data transfer between said register file and said external memory via said address bus, said address bus connecting said control means to said external memory;

a dedicated data bus connecting said external memory with said control means;

a peripheral device;

an external data bus connecting said peripheral device with said external memory;

said dedicated data bus having a higher data transfer rate than that of said external data bus;

an external address bus connecting said peripheral device with said control means;

said control means operable when a particular address area in said external memory which is storing data currently in use in said register file is accessed by said peripheral device for data transfer through said external data bus, for controlling data transfer to said peripheral device by transferring data in said register file to said peripheral device instead of said data stored in said particular address area of said external memory.

19. A microprocessor, comprising:

a register file including a bank of registers now in use;

a bank interface unit which is connected to an external bank RAM through a dedicated high speed bus and includes a current bank pointer to hold the first address of an address area in said bank RAM, said address area corresponding to the bank now in use in said register file; and a bank control unit which has an adder-subtractor or adder to compare the content in said current bank pointer with an address information which is input through an external address bus;

said bank control unit determining from a result of said comparison whether said address information corresponds to said address area in said bank RAM or not, and when said address information corresponds to said area, said bank control unit instructing said register file and said bank interface unit to supply an external data bus connected to said bank RAM and a peripheral device for data communication therebetween with the data in said register file through said dedicated high-speed bus and said bank RAM;

said dedicated high speed bus having a higher data transfer rate than that of said external data bus.

* * * * *